United States Patent
Yin et al.

(10) Patent No.: US 9,491,399 B2
(45) Date of Patent: Nov. 8, 2016

(54) VIDEO SIGNAL ATTENUATION EQUALIZATION CIRCUIT, PROCESSING APPARATUS, AND CONTROL DEVICE AND METHOD

(71) Applicant: Zhejiang Dahua Technology Co., Ltd., Zhejiang (CN)

(72) Inventors: Jun Yin, Zhejiang (CN); Zhicheng Ye, Zhejiang (CN); Zhuqiang Bao, Zhejiang (CN); Yun Xie, Zhejiang (CN); Xingming Zhang, Zhejiang (CN); Liquan Fu, Zhejiang (CN); Jiangming Zhu, Zhejiang (CN); Jun Wu, Zhejiang (CN); Jian Wu, Zhejiang (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 14/442,101

(22) PCT Filed: May 23, 2013

(86) PCT No.: PCT/CN2013/076175
§ 371 (c)(1),
(2) Date: May 12, 2015

(87) PCT Pub. No.: WO2014/071732
PCT Pub. Date: May 15, 2014

(65) Prior Publication Data
US 2016/0173815 A1  Jun. 16, 2016

(30) Foreign Application Priority Data

Nov. 12, 2012 (CN) .......................... 2012 1 0452103

(51) Int. Cl.
*H04N 5/21* (2006.01)
*H04N 7/10* (2006.01)

(52) U.S. Cl.
CPC .................................... *H04N 7/104* (2013.01)

(58) Field of Classification Search
CPC ........ H04N 5/211; H04N 5/268; H04N 5/21; H04N 5/4401; H04L 25/03038; H04L 25/03057; H04L 25/03885; H04B 3/141; H04B 3/145; H04B 3/14

USPC ........ 348/607, 614, 624, 914; 375/229, 233; 333/28 R, 18, 81 R
See application file for complete search history.

(56) References Cited

U.S. PATENT DOCUMENTS 4,785,265 A    11/1988  Molnar et al.
5,341,177 A *  8/1994  Roy ....................... H04N 5/211
                                                       348/614

(Continued)

FOREIGN PATENT DOCUMENTS

CN           1032414 A       4/1989
CN         201160302 Y      12/2008

(Continued)

OTHER PUBLICATIONS

International Search Report for corresponding International Application No. PCT/CN2013/076175 mailed Aug. 29, 2013.

*Primary Examiner* — Sherrie Hsia
(74) *Attorney, Agent, or Firm* — Renner, Otto, Boisselle & Sklar, LLP

(57) ABSTRACT

Disclosed are a video signal attenuation equalization circuit, a video signal processing apparatus, and a control device and method, which are used for solving the problem that the transmission of an analog video signal is distorted after the analog video signal is transmitted by a coaxial cable, so as to guarantee low signal distortion after the video signal is transmitted at a long distance. The video signal attenuation equalization circuit provided in the embodiments of the present invention comprises: a signal driving circuit, an equalization unit and an analog switch unit, wherein the signal driving circuit is connected to the equalization unit and the analog switch unit, and is used for receiving and strengthening an initial video signal, and sending the obtained strengthened initial video signal to the equalization unit and the analog switch unit; the equalization unit is used for performing attenuation equalization on the strengthened initial video signal according to the triggering of a control signal, and after the attenuation equalization sending the video signal to the analog switch unit; and the analog switch unit is used for outputting the strengthened initial video signal or the video signal sent by the equalization unit after the attenuation equalization according to the control of the control signal.

20 Claims, 5 Drawing Sheets

(56) References Cited

U.S. PATENT DOCUMENTS

2009/0219980 A1 9/2009 DiSanto et al.
2010/0110288 A1 5/2010 Ritter et al.
2010/0110299 A1 5/2010 Ritter et al.

FOREIGN PATENT DOCUMENTS

| CN | 101635694 A | 1/2010 |
| CN | 101729846 A | 6/2010 |
| CN | 101953157 A | 1/2011 |

* cited by examiner

VIDEO SIGNAL ATTENUATION EQUALIZATION CIRCUIT, PROCESSING APPARATUS, AND CONTROL DEVICE AND METHOD

This application is a US National Stage of International Application PCT/CN2013/076175, filed May 23, 2013, designating the United States, and claiming priority to Chinese Patent Application No. 201210452103.2, filed with the State Intellectual Property Office of People's Republic of China on Nov. 12, 2012 and entitled "Video signal attenuation equalization circuit, processing device, and controlling device and method", which is hereby incorporated by reference in its entirety.

FIELD

The present invention relates to the field of video technologies and particularly to a video signal attenuation equalization circuit, a video signal processing device, and a controlling device and method for controlling the video signal attenuation equalization circuit to perform attenuation equalization on an analog video signal.

BACKGROUND

In the industry of security and protection, an analog video signal output by an analog video camera needs to be transmitted to a backend receiver through a coaxial cable, and an electric signal will be increasingly attenuated along with the increasing distance to be transmitted through the coaxial cable. Moreover, since the signals of different frequencies have different transmission delays for transmission through the coaxial cable, there will be the phenomenon of group delay, and high-frequency components will be attenuated rapidly, thus resulting in tailing of a video signal, the loss of a high-frequency signal, and other image distortion problems. Since the frequency of a normal standard-definition Composite Video Broadcast Signal (CVBS) ranges between 0 and 6 MHz, the distortion problem will be not obvious. However, for a high-definition analog video signal to be transmitted, since the frequency range of the signal is wider, ranging between 0 and 25 MHz and even between 0 and 50 MHz, the phenomenon of group delay and the attenuation of the high-frequency component will be more apparent.

There exists two general solutions of equalization compensation technology for an analog signal in the prior art:

1. At the signal receiver side, a video signal is compensated by a fixed gain value according to the attenuation of the received video signal, so as to achieve satisfactory amplitude of the signal. This solution may solve the attenuation problem of the amplitude of the signal, which especially effective for the standard-definition analog signal with a narrower bandwidth and a smaller difference between the attenuation of the highest frequency portion and the low-frequency portion of the signal. In addition, the phenomenon of group delay and attenuation of high frequency portion will be not obvious and possible to be improved effectively. But for the compensation of a high-definition analog video signal, merely using fixed amplitude gain may not meet the requirement of a practical application.

2. A solution using an integrated chip, which is also primarily for the markets of standard-definition analog signals. Since it operates in a fixed bandwidth and cannot change the frequency range of the signals according to applications, which is not applicable to high-definition video signals. Moreover since the cost of integrated chips is generally quite high, for cost-sensitive applications, a solution with a higher performance to price ratio is needed.

In summary, the solutions of equalization compensation technology for an analog video signal in the prior art is not applicable to a high-definition video signal.

SUMMARY

Embodiments of the present disclosure provide a video signal attenuation equalization circuit, a video signal processing device, and a controlling device and method for controlling the video signal attenuation equalization circuit to perform attenuation equalization on an analog video signal, so as to address the problem of transmission distortion of a high-definition analog video signal transmitted through a coaxial cable, so as to mitigate signal distortion of the video signal transmitted over a long distance.

An embodiment of the present disclosure provides a video signal attenuation equalization circuit including a signal drive circuit, an equalization unit and an analog switching unit, herein:

the signal drive circuit is connected with the equalization unit and the analog switching unit, and is configured to receive and enhance an initial video signal and to transmit the enhanced initial video signal to the equalization unit and the analog switching unit;

the equalization unit is configured to equalize the attenuation of the enhanced initial video signal transmitted by the signal drive circuit according to the trigger by a control signal, and to transmit the equalized video signal to the analog switching unit; and the analog switching unit is configured to output the enhanced initial video signal transmitted by the signal drive circuit, or the equalized video signal transmitted by the equalization unit according to the control signal.

An embodiment of the present disclosure provides a video signal processing device including the video signal attenuation equalization circuit and a controlling device, herein the controlling device is configured:

to transmit a control signal to the video signal attenuation equalization circuit to control the analog switching unit to output the enhanced initial analog video signal;

to receive the enhanced initial video signal output by the video signal attenuation equalization circuit, and to calculate an attenuation difference of the enhanced initial video signal;

to determine an attenuation difference interval corresponding to the attenuation difference, to determine a control signal corresponding to the attenuation difference interval, and to transmit the control signal to the equalization unit and the analog switching unit in the video signal attenuation equalization circuit; and to hold the current control signal until the video signal is lost, and transmit a control signal to the video signal attenuation equalization circuit to control the analog switching unit to output the initial video analog signal.

An embodiment of the present disclosure provides a controlling device for controlling the video signal attenuation equalization circuit to equalize the attenuation of an analog video signal, including:

an initializing unit configured to transmit a control signal to the video signal attenuation equalization circuit to control the analog switching unit to output the enhanced initial analog video signal;

an attenuation difference calculating unit configured to receive the enhanced initial video signal output by the video signal attenuation equalization circuit, and to calculate an attenuation difference of the enhanced initial video signal;

a compensation determining unit configured to determine an attenuation difference interval corresponding to the attenuation difference, to determine a control signal corresponding to the attenuation difference interval, and to transmit the control signal to the equalization unit and the analog switching unit in the video signal attenuation equalization circuit; and a holding unit to hold the current control signal until the video signal is lost, and transmit a control signal to the video signal attenuation equalization circuit to control the analog switching unit to output the initial video analog signal.

An embodiment of the present disclosure provides a controlling method for controlling the video signal attenuation equalization circuit to equalize the attenuation of an analog video signal, including:

transmitting a control signal to the video signal attenuation equalization circuit to control the analog switching unit to output the enhanced initial analog video signal;

receiving the enhanced initial video signal output by the video signal attenuation equalization circuit, and calculating an attenuation difference of the enhanced initial video signal;

determining an attenuation difference interval corresponding to the attenuation difference, determining a control signal corresponding to the attenuation difference interval, and transmitting the control signal to the equalization unit and the analog switching unit in the video signal attenuation equalization circuit; and holding the current control signal until the video signal is lost, and transmitting a control signal to the video signal attenuation equalization circuit to control the analog switching unit to output the initial video analog signal.

A video signal attenuation equalization circuit, a video signal processing device, and a controlling device and method for controlling the video signal attenuation equalization circuit to equalize the attenuation of an analog video signal, according to embodiments of the present disclosure calculate the amount of attenuation of a video signal, and control the operating state of the specified hardware circuit, to thereby address the problem of transmission distortion of the analog video signal transmitted through the coaxial cable, so as to mitigate signal distortion of the video signal transmitted over a long distance.

DETAILED DESCRIPTION OF THE EMBODIMENTS

Embodiments of the present disclosure provide a video signal attenuation equalization circuit, a video signal processing device, and a controlling device and method for controlling the video signal attenuation equalization circuit to equalize the attenuation of an analog video signal, so as to address the problem of transmission distortion of an analog video signal transmitted through a coaxial cable, so as to mitigate signal distortion of the video signal transmitted over a long distance.

The present disclosure will be described below in details with reference to the drawings.

Figure 1:
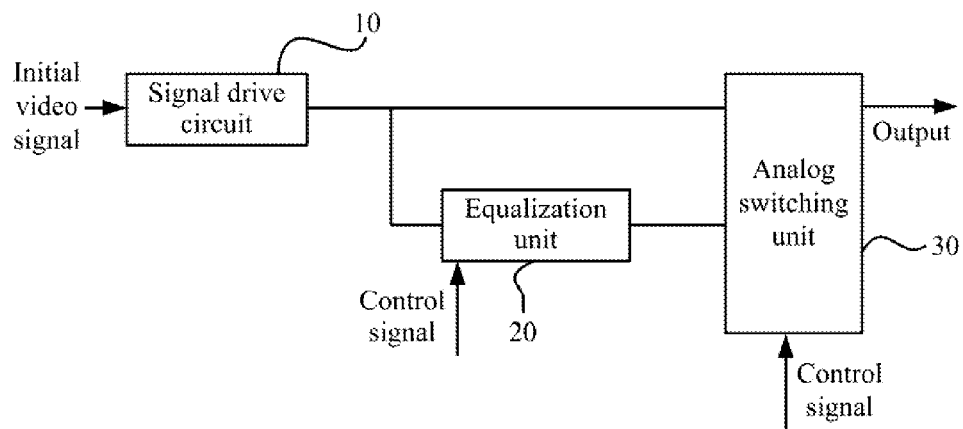
FIG. 1 illustrates a schematic structural diagram of a video signal attenuation equalization circuit according to an embodiment of the present disclosure.

Referring to FIG. 1, a video signal attenuation equalization circuit according to an embodiment of the present disclosure includes:

A signal drive circuit 10 is connected with an equalization unit 20 and an analog switching unit 30, herein the signal drive circuit 10 is configured to receive and enhance an initial video signal, and to transmit the enhanced initial video signal to the equalization unit 20 and the analog switching unit 30;

The equalization unit 20 is configured to equalize the attenuation of the enhanced initial video signal according to the trigger by a control signal, and to transmit the equalized video signal to the analog switching unit 30; and The analog switching unit 30 is configured to output the enhanced initial video signal, or the equalized video signal transmitted by the equalization unit 20 according to the control signal.

Figure 2:
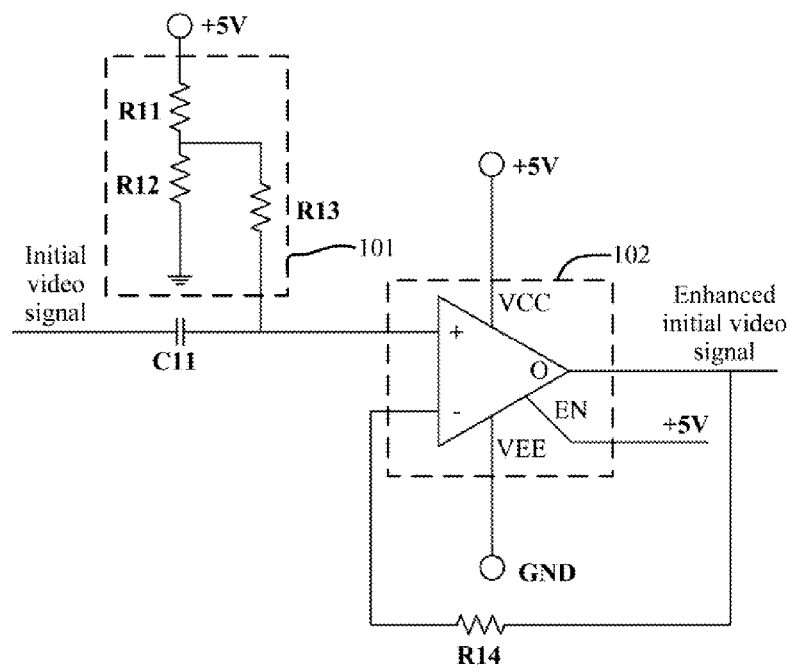
FIG. 2 illustrates a schematic structural diagram of a signal drive circuit according to an embodiment of the present disclosure.

Preferably referring to FIG. 2 illustrating a circuit scheme of the signal drive circuit, the signal drive circuit includes a bias circuit 101 and a first operational amplifier follower circuit 102, herein:

The initial video signal is input to a non-inverting input terminal of the first operational amplifier follower circuit 102 through a first capacitor C11, the non-inverting input terminal of the first operational amplifier follower circuit 102 is connected with the bias circuit 101 providing bias voltage, a first power input terminal VCC is connected with first power voltage 5V, a second power input terminal VEE is grounded, a control terminal EN is connected with the first power voltage 5V, and an inverting input terminal is connected with an output terminal of the operational amplifier follower circuit through a first resistor R14.

The signal drive circuit is a single-ended signal circuit topology, and in FIG. 2, the bias circuit 101 includes three resistors R11, R12 and R13, and herein a first terminal of R11 is connected with the 5V voltage, a second terminal of R11 is connected with a first terminal of R12, and a first terminal of R13, a second terminal of R12 is grounded, and a second terminal of R13 is connected with the non-inverting input terminal of the first operational amplifier follower circuit 102; and the bias circuit 101 includes three resistors R11, R12 and R13 and provides the bias voltage to the analog signal from which direct current is isolated by C11. Preferably the resistances of R13 and R14 are 620Ω, the capacitance of C11 is 22 μF, and the first operational amplifier follower circuit 102 is a current operational amplifier follower circuit with a required bandwidth of more than 100 MHz.

Figure 3:
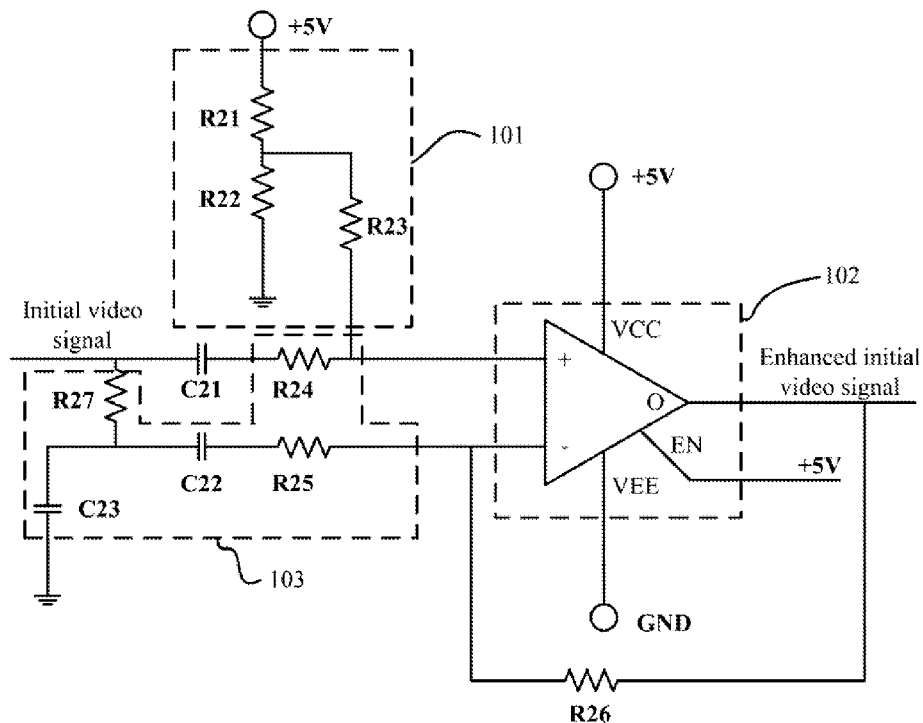
FIG. 3 illustrates a schematic structural diagram of another signal drive circuit according to an embodiment of the present disclosure.

Preferably referring to FIG. 3 illustrating another circuit topology of the signal drive circuit, the signal drive circuit includes a bias unit composed of R21, R22 and R23, a first operational amplifier follower circuit, a first capacitor C21, and a first resistor R26, and further a first differential capacitor C23 and a second differential capacitor C22, and a first differential resistor C27 and a second differential resistor C25, and preferably further includes a second resistor R24 between the first capacitor and a non-inverting input terminal.

The initial video signal is input to a first terminal of the first differential resistor R27; a second terminal of the first differential resistor is connected with a first terminal of the first differential capacitor C23 and a first terminal of the second differential capacitor C22; a second terminal of the second differential capacitor C22 is connected with a first terminal of the second differential resistor R25; a second terminal of the second differential resistor is connected with the inverting input terminal of the first operational amplifier follower circuit 102; and a second terminal of the first differential capacitor C23 is grounded.

The signal drive circuit is a single-ended signal virtual differential circuit topology, and with this circuit topology, common-mode signal interference may be suppressed more effectively, to thereby improve an output signal to noise ratio, so as to improve the signal quality of the analog video signal. In FIG. 3, the resistances of R23, R24, R25 and R26 may be 620Ω, the resistance of R27 may be 75Ω, the capacitances of C21 and C22 may be 22 μF, and the first operational amplifier follower circuit 102 is a current operational amplifier follower circuit with a required bandwidth of more than 100 MHz, and herein R21 and R22 satisfy the relationship of:

$$Vcc \times R22/(R21+R22) < \tfrac{1}{2} Va;$$

Herein Vcc represents supply voltage of the operational amplifier and preferably may be 5V in FIG. 3; and Va represents supply voltage of the analog switch and preferably may be 5V;

Herein R21 and R22 are less than 1 KΩ, for example, R21=290Ω and R22=75Ω.

Figure 4:
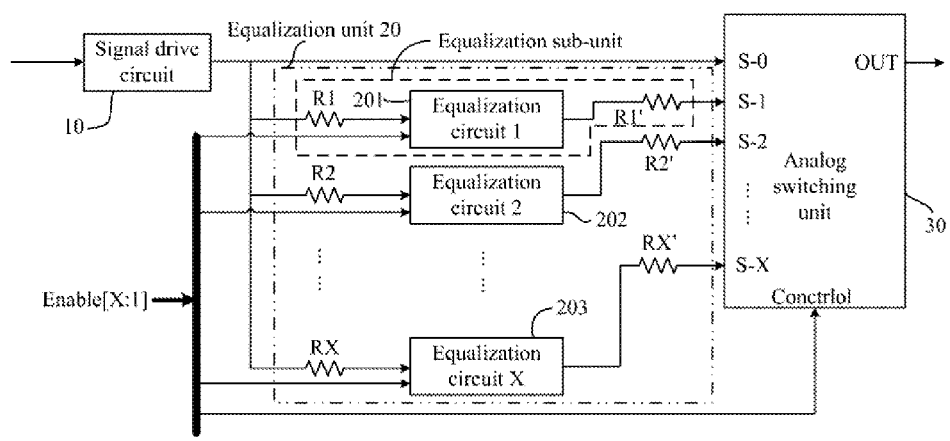
FIG. 4 illustrates a detailed structural diagram of a video signal attenuation equalization circuit according to an embodiment of the present disclosure.

Preferably referring to FIG. 4 illustrating a detailed circuit structure, the equalization unit 20 includes one or more equalization sub-units, and as illustrated, there are a number X of equalization sub-units, and X is determined by required precision in compensation for the signal in an application. Herein, each of the equalization sub-units corresponds to a different attenuation difference interval of power of the video signal and is controlled by the control signal, i.e., an Enable signal, corresponding to the attenuation difference interval, to equalize the attenuation of the received enhanced initial video signal, including amplitude and phase compensation for the video signal, and to transmit the equalized video signal to the analog switching unit.

Preferably the equalization sub-units include first match resistors (R1 to RX), equalization circuits (201 to 20X), and second match resistors (R1' to RX'), and herein the equalization circuits are controlled by the control signal Enable and include first terminals connected with the signal drive circuit through the first match resistors, and second terminals connected with the analog switching unit through the second match resistors.

Correspondingly, the analog switching unit 30 includes a number of (X+1) corresponding analog switches S0 to SX, and herein S0 represents the signal drive circuit, and S1 to SX represent the respective equalization circuits 201 to 20X respectively.

Preferably the Enable signal controls the equalization circuits as follows: at most one of the equalization circuits is enabled to operate at any moment of time, and if all the equalization circuits are disabled from operating, then the circuit currently operates in an non-equalized mode; and when some one of the equalization circuits is enabled to operate, then the circuit currently operates in a corresponding equalized mode.

Preferably the Enable signal controls the analog switching unit 30 as follows: the operating states of the enabled equalization circuits are started by the Enable signal, and the OUT output signal is switched to a signal output in the corresponding operating equalized mode. If all the equalization circuits are disabled from operating, then the OUT output signal is switched onto the enhanced initial video signal output directly by the signal drive circuit 10.

Figure 5:
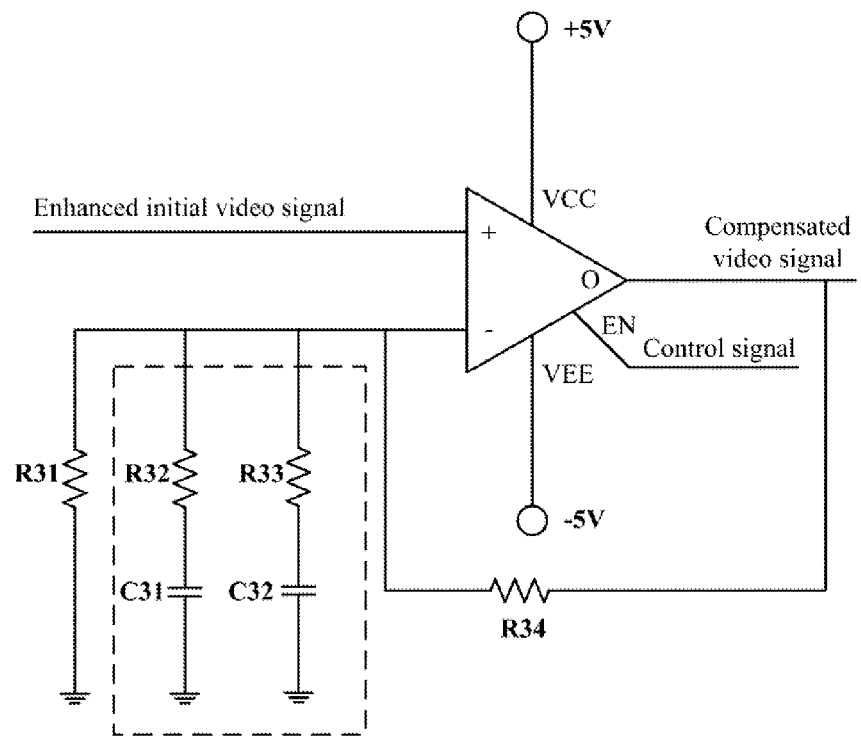
FIG. 5 illustrates a schematic structural diagram of an equalization circuit according to an embodiment of the present disclosure.

Particularly referring to FIG. 5 illustrating the equalization circuit, the equalization circuit includes an attenuation interval determination circuit (in the dotted box as illustrated), a first fixed resistor R31, a second fixed resistor R34, and a second operational amplifier follower circuit, herein:

A non-inverting input terminal of the second operational amplifier follower circuit is connected with the signal drive circuit through the first match resistor;

The first fixed resistor R31 and the attenuation interval determination circuit are connected in parallel with an inverting input terminal of the second operational amplifier follower circuit, and the second fixed resistor R34 is connected with the inverting input terminal and an output terminal of the second operational amplifier follower circuit; and A first power supply input terminal VCC of the second operational amplifier follower circuit is connected with 5V, a second power supply input terminal VEE of the second operational amplifier follower circuit is connected with −5V, and a control terminal EN of the second operational amplifier follower circuit receives the control signal Enable.

Herein the attenuation interval determination circuit as illustrated in FIG. 5 includes a first attenuation interval determination resistor R32 and a second attenuation interval determination resistor R33, and a first attenuation interval determination capacitor C31 and a second attenuation interval determination capacitor C32, where:

A first terminal of the first attenuation interval determination capacitor C31 is grounded, and a second terminal of the first attenuation interval determination capacitor is connected with a first terminal of the first attenuation interval determination resistor R32, and a second terminal of the first attenuation interval determination resistor R32 is connected with the inverting input terminal of the operational amplifier follower circuit; and A first terminal of the second attenuation interval determination capacitor C32 is grounded, and a second terminal of the second attenuation interval determination capacitor is connected with a first terminal of the second attenuation interval determination resistor R33, and a second terminal of the second attenuation interval determination resistor R33 is connected with the inverting input terminal of the operational amplifier follower circuit.

In the circuit scheme as illustrated in FIG. 5, the enhanced initial video signal enhanced by the signal drive circuit is input to the non-inverting input terminal, processed by the circuit and then output at the output terminal, and the input Enable signal is a switch control signal of the equalization circuit, and here the resistance of R31 is 750Ω, the resistance of R34 is 820Ω, and the second operational amplifier follower circuit is a current operational amplifier follower circuit with a required bandwidth of more than 100 MHz and with a time enable control pine (the control terminal of the operational amplifier follower circuit as illustrated).

Moreover, R32, R33, C31 and C32 are selected to match a set of parameters with an attenuation characteristic and a frequency-response characteristic of a cable, for example, the resistance of R32 is 1.2 KΩ, the resistance of R33 is 18Ω, the capacitance of C31 is 68 pF, and the capacitance of C32 is 47 pF.

Figure 6:
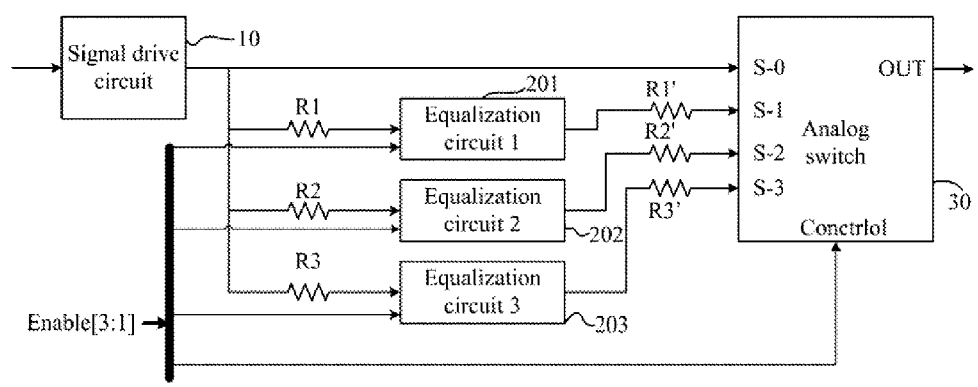
FIG. 6 illustrates a structural diagram of a video signal attenuation equalization circuit according to an embodiment of the present disclosure.

In connection with the signal drive circuit and the equalization unit described above, if the equalization unit in the video signal attenuation equalization circuit includes three equalization sub-units as illustrated in FIG. 6, then the circuit as illustrated in FIG. 6 operates in four scenarios including: no equalization, and compensation for the currently received enhanced initial video signal by one of the three equalization circuits 201 to 203.

The analog video signal is transmitted as follows: the signal drive circuit 10 receives and is driven by the initial video signal to enhance a drive capability of the initial video signal, so as to obtain the enhanced initial video signal, and transmits the enhanced initial video signal to the analog switching unit, the enhanced initial video signal is transmitted to the equalization circuits 201 to 203 respectively through the match resistors R1 to R3, and the equalization circuits are controlled by the control signal Enable upon reception of the enhanced initial video signal, and herein Enable1 controls the equalization circuit 201 to be enabled to operate or disabled from operating, Enable2 controls the equalization circuit 202 to be enabled to operate or disabled from operating, and Enable3 controls the equalization circuit 203 to be enabled to operate or disabled from operating. The output signals of the equalization circuits 201 to 203 are transmitted to the analogy switching unit 30 respectively through the match resistors R1' to R3', and the analogy switching unit 30 is also controlled by the Enable signal to select one of S0 to S3 for output.

The resistances of the match resistors R1 to R3 and R1' to R3' may be 75Ω.

A controlling method for controlling the video signal attenuation equalization circuit according to the embodiment of the present disclosure to equalize the attenuation of an analog video signal will be described below with reference to the drawings.

Firstly, before attenuation equalization is performed on a video signal, the number of equalization circuits and attenuation difference intervals, corresponding to the respective equalization circuits, are determined for required precision in compensation for the signal as needed in a practical application. Appropriate matching parameter values of R32, R33, C31 and C32 in the equalization circuits are selected according to setting of the attenuation difference intervals. For example:

The attenuation difference interval is (2:6], the resistance of R32 is 1.2 KΩ, the resistance of R33 is 18Ω, the capacitance of C31 is 68 pF, and the capacitance of C32 is 47 pF.

The attenuation difference interval is (6:16], the resistance of R32 is 750Ω, the resistance of R33 is 25Ω, the capacitance of C31 is 180 pF, and the capacitance of C32 is 180 pF.

The attenuation difference interval is (16:35], the resistance of R32 is 2.7 KΩ, the resistance of R33 is 10Ω, the capacitance of C31 is 220 pF, and the capacitance of C32 is 270 pF.

Figure 7:
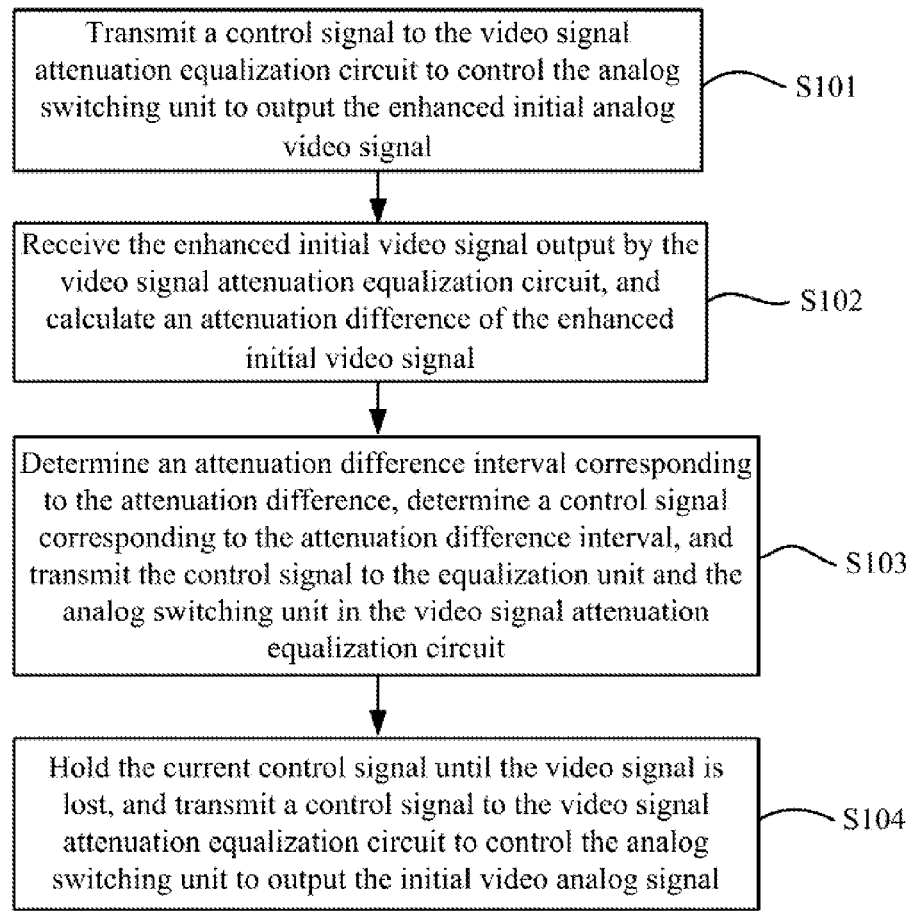
FIG. 7 illustrates a flow chart of a method for controlling the video signal attenuation equalization circuit to equalize the attenuation of an analog video signal according to an embodiment of the present disclosure.

Referring to FIG. 7, a controlling method for controlling the video signal attenuation equalization circuit to equalize the attenuation of an analog video signal according to an embodiment of the present disclosure includes:

The operation S101 is to transmit a control signal to the video signal attenuation equalization circuit, to control the analog switching unit to output the enhanced initial analog video signal; and herein the signal drive circuit is started to be connected with the initial video signal, and the control signal disables all the equalization circuits and switches a switch of the analog switching unit to the enhanced initial video signal output directly by the signal drive circuit, that is, switches the analog switch S0 to output the enhanced initial video signal;

Operation S102 is to receive the enhanced initial video signal output by the video signal attenuation equalization circuit, and to calculate an attenuation difference of the enhanced initial video signal;

Level amplitude values of the received signal at two fixed frequency including a high frequency and a low frequency are compared with signal amplitude values of a standard signal at the frequencies, attenuation values at the two frequencies including the high frequency and the low frequency are calculated respectively, and then the difference between the attenuation values at the two frequencies is calculated;

In this operation, the attenuation value is calculated in the equation of:

$$\sigma = 20 \log(0.3/C) - 20 \log(0.3/S);$$

Figure 8:
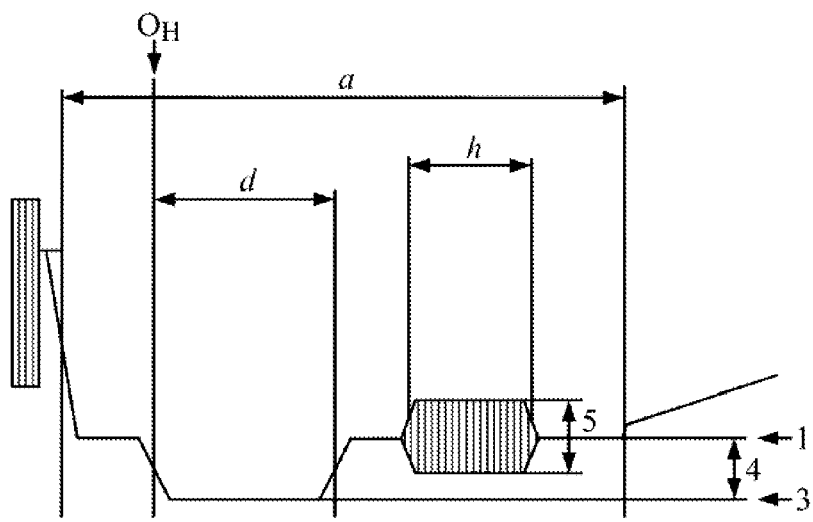
FIG. 8 illustrates a row start characteristic diagram of a video signal.

Referring to FIG. 8 (in FIG. 8, "a" represents a row blank period, "d" represents a row synchronization head temporal range, "h" represents a color synchronization head temporal range, "5" represents a color synchronization head voltage amplitude, "4" between "1" and "3" represents a row synchronization head voltage amplitude, and "OH" represents a starting time of each row), C represents a signal amplitude of the received video signal in a period of time h and corresponds to a high-frequency component of the video signal; and S represents a signal amplitude of the received video signal in a period of time d and corresponds to a low-frequency component of the video signal;

Operation S103 is to determine an attenuation difference interval corresponding to the attenuation difference, to determine a control signal corresponding to the attenuation difference interval, and to transmit the control signal to the equalization unit and the analog switching unit in the video signal attenuation equalization circuit; and herein such one of the equalization circuits is determined from a result of calculation in the operation S103 that σ falls into the attenuation difference interval corresponding to the equalization circuit, and transmitted to the equalization unit and the analog switching unit to start the corresponding equalization circuit and to switch the corresponding analog switch to output the compensated video signal; and Operation S104 is to hold the current control signal until the video signal is lost, and transmit a control signal to the video signal attenuation equalization circuit to control the analog switching unit to output the initial video analog signal.

It shall be noted that the attenuation difference may alternatively be calculated in the operation S102 in the equation of:

$$\sigma' = 10 \log(S/C);$$

Herein C represents a signal amplitude of the received video signal in a period of time h and corresponds to a high-frequency component of the video signal; and S represents a signal amplitude of the received video signal in a period of time d and corresponds to a low-frequency component of the video signal. The attenuation interval corresponding to σ' may not be totally consistent with the attenuation interval corresponding to σ, but the respective elements in the corresponding attenuation interval determination circuit for the purpose of attenuation equalization are the same.

A controlling device, and a video signal processing device, for performing the controlling method will be described below.

Figure 9:
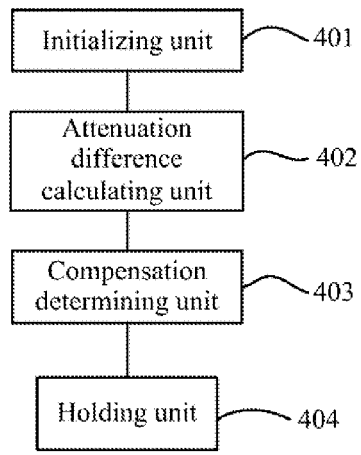
FIG. 9 illustrates a schematic structural diagram of a controlling device according to an embodiment of the present disclosure.

Referring to FIG. 9, a controlling device 40 for controlling the video signal attenuation equalization circuit to equalize the attenuation of an analog video signal according to an embodiment of the present disclosure includes:

An initializing unit 401 is configured to transmit a control signal to the video signal attenuation equalization circuit, to control the analog switching unit to output the enhanced initial analog video signal;

An attenuation difference calculating unit 402 is configured to receive the enhanced initial video signal output by the video signal attenuation equalization circuit and to calculate an attenuation difference of the enhanced initial video signal;

A compensation determining unit 403 is configured to determine an attenuation difference interval corresponding to the attenuation difference, to determine a control signal corresponding to the attenuation difference interval, and to transmit the control signal to the equalization unit and the analog switching unit in the video signal attenuation equalization circuit; and A holding unit 404 is to hold the current control signal until the video signal is lost, and transmit a control signal to the video signal attenuation equalization circuit to control the analog switching unit to output the initial video analog signal.

Preferably the attenuation difference calculating unit 402 configured to calculate the attenuation difference of the enhanced initial video signal is configured:

to compare level amplitude values of the received signal at two fixed frequency including a high frequency and a low frequency with signal amplitude values of a standard signal at the frequencies, and to calculate attenuation values at the two frequencies including the high frequency and the low frequency respectively, and then calculate the difference between the attenuation values at the two frequencies;

For example, referring to FIG. 8 (in FIG. 8, "a" represents a row blank period, "d" represents a row synchronization head temporal range, "h" represents a color synchronization head temporal range, "5" represents a color synchronization head voltage amplitude, "4" between "1" and "3" represents a row synchronization head voltage amplitude, and "OH" represents a starting time of each row), The attenuation value of the enhanced initial video signal may be calculated in the equation of:

$$\sigma = 20 \log(0.3/C) - 20 \log(0.3/S)$$

Herein:

C represents a signal amplitude of the received video signal in a period of time h; and S represents a signal amplitude of the received video signal in a period of time d;

Or the attenuation value may alternatively be calculated in the equation of:

$$\sigma' = 10 \log(S/C)$$

herein C represents a signal amplitude of the received video signal in a period of time h and corresponds to a high-frequency component of the video signal; and S represents a signal amplitude of the received video signal in a period of time d, and corresponds to a low-frequency component of the video signal. The attenuation interval corresponding to σ' may not be totally consistent with the attenuation interval corresponding to σ, but the respective elements in the corresponding attenuation interval determination circuit for the purpose of attenuation equalization are the same.

Figure 10:
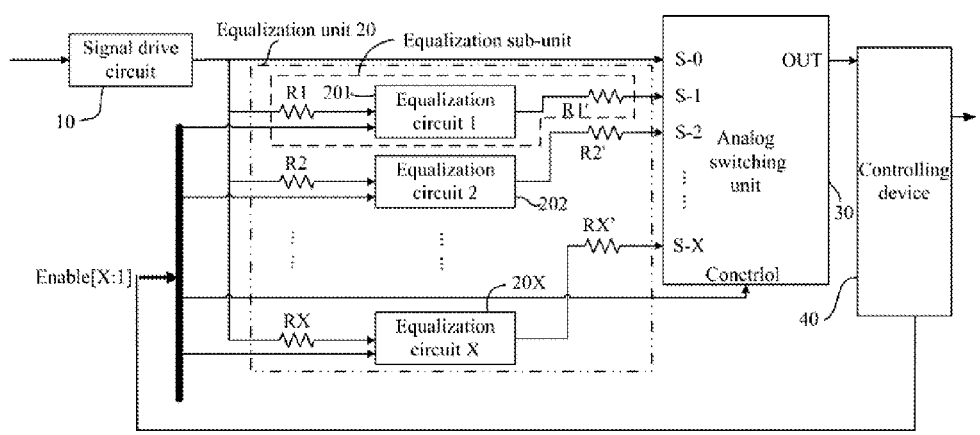
FIG. 10 illustrates a schematic structural diagram of a video signal processing device according to an embodiment of the present disclosure.

Furthermore referring to FIG. 10, a controlling device according to an embodiment of the present disclosure includes the video signal attenuation equalization circuit and the controlling device 40 above.

In summary, a video signal attenuation equalization circuit, a video signal processing device, and a controlling device and method for controlling the video signal attenuation equalization circuit to equalize the attenuation of an analog video signal according to the embodiments of the present disclosure calculate the amount of attenuation of a video signal and control the operating state of the specified hardware circuit, to thereby address the problem of transmission distortion of the analog video signal transmitted through the coaxial cable, so as to mitigate signal distortion of the video signal transmitted over a long distance.

Those skilled in the art shall appreciate that the embodiments of the present disclosure may be embodied as a method, a system or a computer program product. Therefore the present disclosure may be embodied in the form of an all-hardware embodiment, an all-software embodiment or an embodiment of software and hardware in combination. Furthermore the present disclosure may be embodied in the form of a computer program product embodied in one or more computer useable storage mediums (including but not limited to a disk memory, an optical memory, etc.) in which computer useable program codes are contained.

The present disclosure has been described in a flow chart and/or a block diagram of the method, the device (system) and the computer program product according to the embodiments of the present disclosure. It shall be appreciated that respective flows and/or blocks in the flow chart and/or the block diagram and combinations of the flows and/or the blocks in the flow chart and/or the block diagram may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the present disclosure have been described, those skilled in the art benefiting from the underlying inventive concept may make additional modifications and variations to these embodiments. Therefore the appended claims are intended to be construed as encompassing the preferred embodiments and all the modifications and variations coming into the scope of the present disclosure.

Evidently those skilled in the art may make various modifications and variations to the present disclosure without departing from the spirit and scope of the present disclosure. Thus the present disclosure is also intended to encompass these modifications and variations thereto so long as the modifications and variations come into the scope of the claims appended to the present disclosure and their equivalents.

The invention claimed is:

1. A video signal attenuation equalization circuit, comprising a signal drive circuit, an equalization unit and an analog switching unit, wherein:
the signal drive circuit is connected with the equalization unit and the analog switching unit, and is configured to receive and enhance an initial video signal and to transmit the enhanced initial video signal to the equalization unit and the analog switching unit;
the equalization unit is configured to equalize attenuation of the enhanced initial video signal transmitted by the signal drive circuit according to the trigger by a control signal, and to transmit the attenuated and equalized video signal to the analog switching unit; and
the analog switching unit is configured to output the enhanced initial video signal transmitted by the signal drive circuit, or the attenuated and equalized video signal transmitted by the equalization unit according to the control signal.

2. The video signal attenuation equalization circuit according to claim 1, wherein the signal drive circuit comprises a bias circuit and a first operational amplifier follower circuit, wherein:
the initial video signal is input to a non-inverting input terminal of the first operational amplifier follower circuit through a first capacitor, the non-inverting input terminal of the first operational amplifier follower circuit is connected with the bias circuit providing bias voltage, a first power input terminal is connected with first power voltage, a second power input terminal is grounded, a control terminal is connected with the first power voltage, and an inverting input terminal is connected with an output terminal of the operational amplifier follower circuit through a first resistor.

3. The video signal attenuation equalization circuit according to claim 2, wherein the signal drive circuit further comprises: a first differential capacitor and a second differential capacitor, a first differential resistor and a second differential resistor, and a second resistor,
wherein the initial video signal is input to a first terminal of the first differential resistor;
a second terminal of the first differential resistor is connected with a first terminal of the first differential capacitor and a first terminal of the second differential capacitor; a second terminal of the second differential capacitor is connected with a first terminal of the second differential resistor; a second terminal of the second differential resistor is connected with the inverting input terminal of the first operational amplifier follower circuit; a second terminal of the first differential capacitor is grounded; and the second resistor is connected between the first capacitor and the non-inverting input terminal.

4. A video signal processing device, comprising the video signal attenuation equalization circuit according to claim 3 and a controlling device, wherein the controlling device is configured:
to transmit a control signal to the video signal attenuation equalization circuit to control the analog switching unit to output the enhanced initial analog video signal;
to receive the enhanced initial video signal output by the video signal attenuation equalization circuit, and to calculate an attenuation difference of the enhanced initial video signal;
to determine an attenuation difference interval corresponding to the attenuation difference, to determine a control signal corresponding to the attenuation difference interval, and to transmit the control signal to the equalization unit and the analog switching unit in the video signal attenuation equalization circuit; and
to hold the current control signal until the video signal is lost, and transmit a control signal to the video signal attenuation equalization circuit to control the analog switching unit to output the initial video analog signal.

5. A video signal processing device, comprising the video signal attenuation equalization circuit according to claim 2 and a controlling device, wherein the controlling device is configured:
to transmit a control signal to the video signal attenuation equalization circuit to control the analog switching unit to output the enhanced initial analog video signal;
to receive the enhanced initial video signal output by the video signal attenuation equalization circuit, and to calculate an attenuation difference of the enhanced initial video signal;
to determine an attenuation difference interval corresponding to the attenuation difference, to determine a control signal corresponding to the attenuation difference interval, and to transmit the control signal to the equalization unit and the analog switching unit in the video signal attenuation equalization circuit; and
to hold the current control signal until the video signal is lost, and transmit a control signal to the video signal attenuation equalization circuit to control the analog switching unit to output the initial video analog signal.

6. A controlling device controlling the video signal attenuation equalization circuit according to claim 2 to perform attenuation equalization on an analog video signal, comprising:
an initializing unit configured to transmit a control signal to the video signal attenuation equalization circuit, to control the analog switching unit to output the enhanced initial analog video signal;

an attenuation difference calculating unit configured to receive the enhanced initial video signal output by the video signal attenuation equalization circuit, and to calculate an attenuation difference of the enhanced initial video signal;

a compensation determining unit configured to determine an attenuation difference interval corresponding to the attenuation difference, to determine a control signal corresponding to the attenuation difference interval, and to transmit the control signal to the equalization unit and the analog switching unit in the video signal attenuation equalization circuit; and a holding unit to hold the current control signal until the video signal is lost, and transmit a control signal to the video signal attenuation equalization circuit to control the analog switching unit to output the initial video analog signal.

7. A controlling method controlling the video signal attenuation equalization circuit according to claim 2 to perform attenuation equalization on an analog video signal, comprising:

transmitting a control signal to the video signal attenuation equalization circuit to control the analog switching unit to output the enhanced initial analog video signal;

receiving the enhanced initial video signal output by the video signal attenuation equalization circuit, and calculating an attenuation difference of the enhanced initial video signal;

determining an attenuation difference interval corresponding to the attenuation difference, determining a control signal corresponding to the attenuation difference interval, and transmitting the control signal to the equalization unit and the analog switching unit in the video signal attenuation equalization circuit; and holding the current control signal until the video signal is lost, and transmitting a control signal to the video signal attenuation equalization circuit to control the analog switching unit to output the initial video analog signal.

8. The video signal attenuation equalization circuit according to claim 1, wherein the equalization unit comprises one or more equalization sub-units, each of the equalization sub-units corresponds to a different attenuation difference interval of power of the video signal, and is controlled by a control signal corresponding to the attenuation difference interval, to equalize the attenuation of the received enhanced initial video signal and to transmit the attenuated and equalized video signal to the analog switching unit.

9. The video signal attenuation equalization circuit according to claim 8, wherein the equalization sub-units comprise first match resistors, equalization circuits, and second match resistors, wherein the equalization circuits are controlled by the control signal and comprise first terminals connected with the signal drive circuit through the first match resistors, and second terminals connected with the analog switching unit through the second match resistors.

10. The video signal attenuation equalization circuit according to claim 9, wherein each of the equalization circuits comprises an attenuation interval determination circuit, a first fixed resistor, a second fixed resistor, and a second operational amplifier follower circuit, wherein:

a non-inverting input terminal of the second operational amplifier follower circuit is connected with the signal drive circuit through the first match resistors;

the first fixed resistor and the attenuation interval determination circuit are connected in parallel with an inverting input terminal of the second operational amplifier follower circuit, and the second fixed resistor is connected with the inverting input terminal and an output terminal of the second operational amplifier follower circuit; and a first power supply input terminal of the second operational amplifier follower circuit is connected with first power voltage, a second power supply input terminal of the second operational amplifier follower circuit is connected with second power voltage, and a control terminal of the second operational amplifier follower circuit receives the control signal.

11. The video signal attenuation equalization circuit according to claim 10, wherein the attenuation interval determination circuit comprises a first attenuation interval determination resistor and a second attenuation interval determination resistor, and a first attenuation interval determination capacitor and a second attenuation interval determination capacitor, wherein:

a first terminal of the first attenuation interval determination capacitor is grounded, and a second terminal of the first attenuation interval determination capacitor is connected with a first terminal of the first attenuation interval determination resistor, and a second terminal of the first attenuation interval determination resistor is connected with the inverting input terminal of the operational amplifier follower circuit; and a first terminal of the second attenuation interval determination capacitor is grounded, and a second terminal of the second attenuation interval determination capacitor is connected with a first terminal of the second attenuation interval determination resistor, and a second terminal of the second attenuation interval determination resistor is connected with the inverting input terminal of the operational amplifier follower circuit.

12. A video signal processing device, comprising the video signal attenuation equalization circuit according to claim 8 and a controlling device, wherein the controlling device is configured:

to transmit a control signal to the video signal attenuation equalization circuit to control the analog switching unit to output the enhanced initial analog video signal;

to receive the enhanced initial video signal output by the video signal attenuation equalization circuit, and to calculate an attenuation difference of the enhanced initial video signal;

to determine an attenuation difference interval corresponding to the attenuation difference, to determine a control signal corresponding to the attenuation difference interval, and to transmit the control signal to the equalization unit and the analog switching unit in the video signal attenuation equalization circuit; and to hold the current control signal until the video signal is lost, and transmit a control signal to the video signal attenuation equalization circuit to control the analog switching unit to output the initial video analog signal.

13. A controlling device controlling the video signal attenuation equalization circuit according to claim 8 to perform attenuation equalization on an analog video signal, comprising:

an initializing unit configured to transmit a control signal to the video signal attenuation equalization circuit, to control the analog switching unit to output the enhanced initial analog video signal;

an attenuation difference calculating unit configured to receive the enhanced initial video signal output by the video signal attenuation equalization circuit, and to calculate an attenuation difference of the enhanced initial video signal;

a compensation determining unit configured to determine an attenuation difference interval corresponding to the attenuation difference, to determine a control signal corresponding to the attenuation difference interval, and to transmit the control signal to the equalization unit and the analog switching unit in the video signal attenuation equalization circuit; and a holding unit to hold the current control signal until the video signal is lost, and transmit a control signal to the video signal attenuation equalization circuit to control the analog switching unit to output the initial video analog signal.

14. A controlling method controlling the video signal attenuation equalization circuit according to claim 8 to perform attenuation equalization on an analog video signal, comprising:

transmitting a control signal to the video signal attenuation equalization circuit to control the analog switching unit to output the enhanced initial analog video signal;

receiving the enhanced initial video signal output by the video signal attenuation equalization circuit, and calculating an attenuation difference of the enhanced initial video signal;

determining an attenuation difference interval corresponding to the attenuation difference, determining a control signal corresponding to the attenuation difference interval, and transmitting the control signal to the equalization unit and the analog switching unit in the video signal attenuation equalization circuit; and holding the current control signal until the video signal is lost, and transmitting a control signal to the video signal attenuation equalization circuit to control the analog switching unit to output the initial video analog signal.

15. A video signal processing device, comprising the video signal attenuation equalization circuit according to claim 1 and a controlling device, wherein the controlling device is configured:

to transmit a control signal to the video signal attenuation equalization circuit to control the analog switching unit to output the enhanced initial analog video signal;

to receive the enhanced initial video signal output by the video signal attenuation equalization circuit, and to calculate an attenuation difference of the enhanced initial video signal;

to determine an attenuation difference interval corresponding to the attenuation difference, to determine a control signal corresponding to the attenuation difference interval, and to transmit the control signal to the equalization unit and the analog switching unit in the video signal attenuation equalization circuit; and to hold the current control signal until the video signal is lost, and transmit a control signal to the video signal attenuation equalization circuit to control the analog switching unit to output the initial video analog signal.

16. The device according to claim 15, wherein the controlling device configured to calculate the attenuation difference of the enhanced initial video signal, by calculating the attenuation difference from an attenuation value of a high-frequency component of the enhanced initial video signal relative to a standard signal and an attenuation value of a low-frequency component of the enhanced initial video signal relative to the standard signal.

17. A controlling device controlling the video signal attenuation equalization circuit according to claim 1 to perform attenuation equalization on an analog video signal, comprising:

an initializing unit configured to transmit a control signal to the video signal attenuation equalization circuit, to control the analog switching unit to output the enhanced initial analog video signal;

an attenuation difference calculating unit configured to receive the enhanced initial video signal output by the video signal attenuation equalization circuit, and to calculate an attenuation difference of the enhanced initial video signal;

a compensation determining unit configured to determine an attenuation difference interval corresponding to the attenuation difference, to determine a control signal corresponding to the attenuation difference interval, and to transmit the control signal to the equalization unit and the analog switching unit in the video signal attenuation equalization circuit; and a holding unit to hold the current control signal until the video signal is lost, and transmit a control signal to the video signal attenuation equalization circuit to control the analog switching unit to output the initial video analog signal.

18. The controlling device according to claim 17, wherein the attenuation difference calculating unit configured to calculate the attenuation difference of the enhanced initial video signal, by calculating the attenuation difference, from an attenuation value of a high-frequency component of the enhanced initial video signal relative to a standard signal and an attenuation value of a low-frequency component of the enhanced initial video signal relative to the standard signal.

19. A controlling method controlling the video signal attenuation equalization circuit according to claim 1 to perform attenuation equalization on an analog video signal, comprising:

transmitting a control signal to the video signal attenuation equalization circuit to control the analog switching unit to output the enhanced initial analog video signal;

receiving the enhanced initial video signal output by the video signal attenuation equalization circuit, and calculating an attenuation difference of the enhanced initial video signal;

determining an attenuation difference interval corresponding to the attenuation difference, determining a control signal corresponding to the attenuation difference interval, and transmitting the control signal to the equalization unit and the analog switching unit in the video signal attenuation equalization circuit; and holding the current control signal until the video signal is lost, and transmitting a control signal to the video signal attenuation equalization circuit to control the analog switching unit to output the initial video analog signal.

20. The method according to claim 19, wherein the attenuation difference calculating unit configured to calculate the attenuation difference of the enhanced initial video signal, by calculating the attenuation difference from an attenuation value of a high-frequency component of the enhanced initial video signal relative to a standard signal and an attenuation value of a low-frequency component of the enhanced initial video signal relative to the standard signal.

* * * * *